3,053,843
NEW CONDENSATION PRODUCTS DERIVED
FROM TETRAMERIC CYANOGEN HALIDES
Hans Gysin, Basel, Enrico Knüsli, Riehen, near Basel, and
Jürg Rumpf, Binningen, near Basel, Switzerland, assignors to J. R. Geigy A.-G., Basel, Switzerland
No Drawing. Filed July 11, 1960, Ser. No. 41,798
Claims priority, application Switzerland Sept. 28, 1959
8 Claims. (Cl. 260—249.5)

The present invention concerns a process for the production of new condensation products as well as the compounds obtained by this process which can be used in many ways as described in detail below.

It has been found that valuable new condensation products are obtained if tetrameric cyanogen halides of the formula $C_4N_4Hal_4$ having the structural Formula I

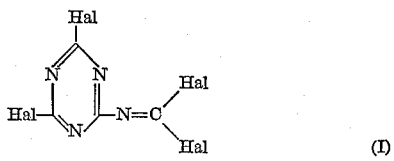

wherein Hal is a halogen atom, in particular chlorine, or also bromine or fluorine, is reacted with one to four mols of ammonia and/or organic compounds which contain at least one replaceable hydrogen atom bound to a hetero atom in a homeopolar manner, the reaction being performed in the presence of acid binding agents, to form condensation products of the general formula

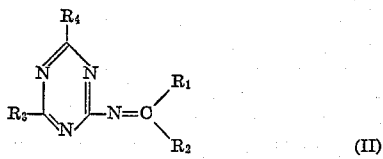

wherein $R_1$ represents a substituted amino group such as a low molecular mono- or di-alkylamino group having alkyl radicals containing 1–4 carbon atoms such as the methyl, ethyl, n-propyl, isopropyl, n-butyl-, isobutyl, sec. butyl or tert. butyl radicals, in particular a low molecular dialkylamino group, or it represents an anilino or N-(lower alkyl)-anilino group possibly substituted in the aromatic nucleus by halogen, in particular by chlorine, particularly the N-methyl or N-ethyl anilino group, or it represents an organic radical, particularly an aromatic radical bound by an oxygen or a sulphur atom, advantageously a possibly halogen-substituted phenylmercapto radical, such as, e.g. a chlorophenylmercapto radical, $R_2$, $R_3$ and $R_4$ independently of each other represent halogen such as e.g. chlorine, bromine and fluorine, particularly chlorine, or they represent substituted amino radicals corresponding to the definition of $R_1$, whereby in the case of a nuclear-substituted anilino or N-(lower alkyl)-anilino group, an aromatic radical enabling the azo coupling to take place such as, e.g. the 1-hydroxy-3-sulphonaphthaneaminocarboxy-(6)-radical, or a diazotisable group, such as, e.g. an amino group and, possibly, other substitutents such as, e.g. the sulpho group, can be present, and wherein $R_1$ and $R_2$ together with the vicinal carbon atom can also represent a benzimidazoline ring.

Tetrameric cyanogen chloride is utilised principally as tetrameric cyanogen halide according to the invention. It is produced, for example, on polymerising cyanogen chloride in inert organic solvents such as hydrocarbons, in the presence of hydrogen chloride and of dialkyl ethers or dialkylamides of lower fatty acids, possibly under pressure. It is obtained, together with trimeric crystalline cyanuric chloride, as an oily liquid which, after removal of the organic solvent (which can be used again), is easily separated by distillation. Pure tetrameric cyanogen chloride is a water-clear, oily liquid; its density is $d_{20}^4$ 1.681, its refraction index is $n_{20}$=1.5759 and it can be distilled without decompositoin at 126° C. under 14 mm. Hg pressure. Elementary analysis corresponds to the formula $C_4N_4Cl_4$. On hydrolysing in water at 20° C., a quantitative yield of 2-amino-4,6-dichloro-1,3,5-triazine is obtained therefrom while 1 mol of carbon dioxide and 2 mols of hydrogen chloride are split off. On hydrolysing in water at 100° C., 2,4,6-trihydroxy-1,3,5-triazine (cyanuric acid) is obtained therefrom while 1 mol of carbon dioxide, 4 mols of hydrogen chloride and 1 mol of ammonia are split off. This chemical behaviour indicates the accuracy of the Formulae I and II and shows that tetrameric cyanogen chloride contains 4 reactive chlorine atoms. Under suitable conditions, these react gradually with compounds which contain replaceable hydrogen atoms. If different starting materials are used one after the other, then compounds of the general Formula II are obtained wherein $R_1$, $R_2$, $R_3$ and $R_4$ represent different organic radicals bound by sulphur or oxygen atoms or a substituted amino group and, in an incomplete reaction, some of them also represent halogen. In the first place, the halogen atoms of the side chain react, and this even in the cold. The compounds thus formed with one or two replaceable halogens are still very reactive bodies which, depending on the organic substituent, still react with the moisture in the air and, therefore, must be stored in closed vessels. In general, reaction products having a secondary amine are more stable than those having a primary amine. Tetrameric cyanogen bromide can be produced in a similar way to tetrameric cyanogen chloride and it can be reacted as defined in this invention. Finally, on reacting tetrameric cyanogen chloride with potassium fluoride, starting materials of the Formula I used according to the invention can be obtained, in which "Hal" completely or partially represents fluorine.

Relatively simply constructed, uncoloured, aliphatic, cycloaliphatic, araliphatic, aromatic or heterocyclic hydroxyl compounds, mercaptans, primary and secondary amines and also heterocyclic compounds having NH groups as ring members are used as starting materials with at least one replaceable hydrogen atom bound in a homeopolar manner by way of a hetero atom. Thus the non-metals of the 5th and 6th group of Mendelejeff's periodic system of the elements are used as hetero atoms promoting the linkage in the condensation products according to the invention, i.e. the elements of the 5th and 6th group of the first and second periods. Starting materials used according to the invention can also contain still further replaceable hydrogen atoms, advantageously of slighter reactivity, such as, e.g. in amino groups the reactivity of which is reduced by vicinal substituents. This is the case, for example, in aromatic o-aminoaryl sulphonic acids. Examples of suitable starting materials for the production of condensation products according to the invention are: methanol, ethanol, propanol, isopropanol, n-butanol, isoamyl alcohol, n-hexyl alcohol, allyl alcohol, methoxyethanol, ethoxyethanol, n-butyloxyethanol, dimethylaminoethanol, diethylaminoethanol, cyclohexanol, methylcyclohexanol, benzyl alcohol, p-chlorobenzyl alcohol, α-phenylethyl alcohol, 2-phenylethanol, 3-phenylpropanol, phenol, o-chlorophenol, p-nitrophenol, 2,4-dichlorophenol, 4-isopropylphenol, 4-tert. butylphenol, 4-tert. amylphenol, 2,4-diisopropylphenol, 1-naphthol, 2-naphthol, furfuryl alcohol, tetrahydrofurfuryl alcohol, acetone glycerine, 2-pyrrolidinyl ethanol and 2-piperidinyl ethanol; methyl mercaptan, ethyl mercaptan, isopropyl mercaptan, allyl mercaptan, thiophenol, p-nitrothiophenol, 2-mercaptobenzoxazole and 2-mercaptobenzthiazole; methylamine, ethylamine, n-propylamine, isopropylamine, n-butylamine, isobutylamine, n-amylamine, n-hexylamine, allylamine, methallylamine, 3-methoxypropylamine, 3-isopropoxypropylamine, ethanolamine, ethylenediamine, N-acetylethylenediamine, cyclohexylamine, dodecylamine, hexadecylamine, octadecylamine, N-dodecylethylenediamine, N-dodecylpropylenediamine-(1,2), benzylamine, aniline, o-chloraniline, m-chloraniline, p-chloraniline, p-bromaniline, o-toluidine, m-toluidine, p-toluidine, o-nitraniline, m-nitraniline, p-nitraniline, 2,4-dimethyl aniline, 1-aminobenzene-2-sulphonic acid, 1-aminobenzene-3-sulphonic acid, 1-aminobenzene-4-sulphonic acid, 4-nitro-1-aminobenzene-2-sulphonic acid, 1-aminobenzene-2,5-disulphonic acid, 4-methyl - 1 - aminobenzene - 2 - sulphonic acid, 3 - chloro-4-aminobenzene-1-sulphonic acid, 5-chloro-2-aminobenzene-1-sulphonic acid, 4-nitro-2-aminobenzene-1-sulphonic acid, 2-nitro-4-aminobenzene-1-sulphonic acid, 1,3-diaminobenzene-4-sulphonic acid, 1,3-diamino-6-methylbenzene-4-sulphonic acid, 2-amino-4-acetamidobenzene-1-sulphonic acid, 2-amino-5-acetamidobenzene-1-sulphonic acid, 5-chloro-2-amino-4-acetamidobenzene-1-sulphonic acid, anthranilic acid, salicyclic acid, p-hydroxybenzoic acid, o-aminophenol, o-aminothiophenol, o-phenylenediamine, p-aminophenol, p-phenylenediamine, α-naphthylamine, β-naphthylamine, 2-amino-hydroxynaphthalene-7-sulphonic acid, 2-amino-8-hydroxynaphthalene-6-sulphonic acid, 2-(3'- or 4'-aminobenzoylamino)-5-hydroxynaphthalene-7-sulphonic acid, p-aminodiphenyl, 2-aminothiazole, 2-amino pyridine and cyanmethine; dimethylamine, N-methylethylamine, N-methyldi-isopropylamine, di-n-butylamine, diallylamine, diethanolamine, N-methylcyclohexylamine, N-methylbenzylamine, N-methylaniline, N-ethyl-o-toluidine, N-benzyl aniline, 1-N-ethylaminobenzene-4-sulphonic acid, 2-methylaminothiazole, pyrrolidine, piperidine, morpholine and 1,2,3,4-tetrahydroquinoline.

The reaction of the tetrameric cyanogen halides with the starting materials containing replaceable hydrogen can be performed in aqueous/organic or in anhydrous organic solution depending on the solubility and/or the marketed form of the compound to be reacted. If, in a gradual reaction, water soluble intermediate products are formed, these can possibly also be further reacted in an aqueous medium. In aqueous/organic media for the reactions of tetrameric cyanogen halides, advantageously organic solvents which are miscible with water are used such as dioxan or acetone, particularly if aqueous solutions of starting materials having replaceable hydrogen atoms or aqueous solutions of their salts are used, for example, if aqueous solutions of aliphatic amines, of salts of aliphatic or aromatic amines with acids or of alkali metal salts of aminoaryl sulphonic acid are used. It is advantageous if the hydrohalic acid liberated in the reaction is bound with the aid of mineral acid buffering agents such as alkali carbonates or of mixtures of buffer salts consisting, for example, of alkali-o-phosphates, alkali metal salts of lower fatty acids and alkali bicarbonates. It is also of advantage if the pH of the reaction medium is never allowed to considerably exceed 8 and, in a first step of the reaction of tetrameric cyanogen halide with only one mol of starting material having replaceable hydrogen atoms, it is advantageous if the medium is kept at a lower pH, for example between 2 and 3.

The following are suitable, for example, for the reaction in anhydrous organic solvents: petroleum ether, cyclohexane, benzene, toluene, xylenes, carbon tetrachloride, chloroform, methylene chloride, chlorobenzene, diethyl ether, anisol, tetrahydrofurane, dioxan and butanone. Reactions with several mols of a low molecular alcohol can also possibly be performed in an excess thereof.

In general, the first and also the second halogen atoms of the tetrameric cyanogen halides react much more easily at low temperatures, e.g. at room temperature or under, than the third. The third and, particularly the fourth, halogen atom must be reacted at elevated temperature and often even under pressure. Naturally, the most expedient reaction conditions also depend on the reactivity of the other reaction components.

Basic reaction components act simultaneously as acid binding agents and, therefore, possibly double the molar amount must be added; however, also the usual acid binding agents such as, e.g. tertiary organic nitrogen bases, can be used. Acid binding agents are also particularly advantageous in reactions with alcohols, phenols or mercaptans; possibly these starting materials can be converted into their salts with such agents as, for example, alkali metals, amides, hydroxides or carbonates, before the reaction with the tetrameric cyanogen halides.

In the reaction of tetrameric cyanogen halide in the first step with components which contain two condensable groups in positions suitable for the formation of rings, e.g. at neighbouring carbon atoms, also condensation products in ring form are obtained. Thus, for example, in the condensation of aromatic o-diamino, o-aminohydroxy or o-aminomercapto compounds in the first step, under suitable reaction conditions, aryloimidazolylamino-, arylo-oxazolylamino- and arylothiazolylamino-triazine compounds are formed.

The new condensation products can be used in many ways, for example (a) for the production of dyeings, (b) as agricultural chemicals, e.g. as herbicides, defoliants, fungicides, and (c) for the production of textile auxiliary products. In addition, the condensation products according to the invention which contain substituents suitable for the formation of dyestuffs, for example, groups making the azo coupling possible or diazotisable groups, can also be used as starting materials for the production of dyeings by, for example, fixing them alkaline on the fibre and then, if they contain diazotisable amino groups, diazotising and treating with solutions of coupling components or, if they are capable of coupling, treating with solutions of diazonium compounds.

The following examples further illustrate the performance of the process according to the invention and also the compounds obtained thereby. Parts are given therein as parts by weight and their relationship to parts by volume is as that of grammes to cubic centimetres. The temperatures are in degrees centigrade.

EXAMPLE 1

4.92 parts of tetrameric cyanogen chloride are dissolved in 100 parts of anhydrous ether and 2.92 parts of diethylamine in 50 parts of anhydrous ether are added dropwise at —15°. A precipitate is formed. After one hour's stirring at —10° the solution is weakly acid to litmus paper. The diethylamine hydrochloride is filtered off and the ether is distilled off. The crystalline reaction product so obtained of 1 mol of tetrameric cyanogen chloride with 1 mol of diethylamine melts, after recrystallising once from diethyl ether/petroleum ether, at 78–80°. The yield of crude product is 94%. Elementary analysis for $C_8H_{10}Cl_3N_5$ (282.5) gave the following values:

| | C, percent | H, percent | Cl, percent | N, percent |
|---|---|---|---|---|
| found | 34.13 | 3.79 | 36.78 | 24.97 |
| calculated | 34.00 | 3.57 | 37.64 | 24.79 |

In conformity with Formula II in the description and with the progress of the hydrolysis described below of tetrameric cyanogen chloride, the following structure is attributed to the new compound:

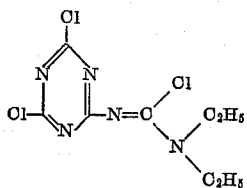

The tetrameric cyanogen chloride used in this and in the following examples is produced as follows:

300 parts of chlorobenzene and 6 parts of dimethyl formamide are saturated with hydrogen chloride at 10–15° and 100 parts of cyanogen chloride are added all at once. After some time, the temperature rises to 65–70°. On attaining the maximum temperature, the reaction mixture is cooled to 15° and another 100 parts of cyanogen chloride are added. After the temperature has again attained a maximum of about 55–60°, it is cooled to 20° and a last portion of 200 parts of cyanogen chloride is added. After the temperature has again risen the reaction is complete and the reaction product is distilled off. After a first fraction, consisting of chlorobenzene, and a second fraction consisting of cyanuric chloride, a fraction is attained at 90–120° under 5 mm. pressure which boils on redistilling at 126°/14 mm. Hg.

About 20% of tetrameric cyanogen chloride is obtained in this way. It is a water-clear oily liquid of the composition $C_4N_4Cl_4$ which can be distilled at 126°/14 mm. Hg without decomposition. Also about 70% of pure cyanuric chloride is obtained. The density of the tetrameric cyanogen chloride is $d_{20}^4 = 1.681$ and its refraction index is $n_{20} = 1.5759$. The molecular weight of 239 determined ebullioscopically in benzene agrees well with the values of 246 calculated from the formula $C_4N_4Cl_4$. Elementary analysis for this formula gave the following values:

|  | C, percent | H, percent | N, percent | Cl, percent | O, percent |
|---|---|---|---|---|---|
| calculated | 19.73 | 0.0 | 23.06 | 57.78 | 0.0 |
| found | 19.54 | 0.0 | 22.79 | 57.67 | 0.0 |

Tetrameric cyanogen chloride is split already at room temperature in water, into 2 mols of hydrogen chloride, one mol of carbon dioxide and one mol of 2-amino-4,6-dichloro-1,3,5-triazine. In boiling water, however, it splits into 3 mols of hydrogen chloride, 1 mol of ammonium chloride, 1 mol of carbon dioxide and 1 mol of cyanuric acid as the following tests show:

(a) *Hydrolysis of Tetrameric Cyanogen Chloride in Water at 20°*

1 g. of tetrameric cyanogen chloride is shaken with 50 g. of water. After some time, depending on vigour of the shaking, the oil changes into colourless needles. The suspension is shaken with 50 ml. of ether, the ether extract is separated and dried over sodium sulphate. After concentrating the ether solution to about one third of its volume, the precipitated crystals are filtered off and recrystallised once from benzene. Analysis for the formula $C_3H_2N_4Cl_2$ gave the following values:

|  | C, percent | H, percent | N, percent | Cl, percent |
|---|---|---|---|---|
| found | 21.89 | 1.23 | 33.89 | 43.09 |
| calculated | 21.84 | 1.22 | 33.96 | 42.98 |

The melting point of this hydrolysis product mixed with a 2-amino-4,6-dichloro-1,3,5-triazine produced in another manner is the known melting point of 239–240° without depression (uncorrected). Two equivalents of hydrochloric acid can be titrated in the aqueous filtrate and one equivalent of carbon dioxide can be washed out from the exhaust gas. The progress of the reaction shows that there are two particularly mobile chlorine atoms not bound to the triazine ring so that the following structural formula and progress of hydrolysis appear:

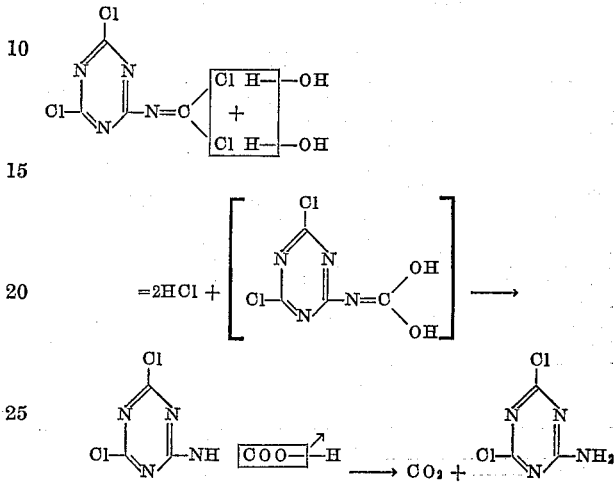

(b) *Hydrolysis of Tetrameric Cyanogen Chloride in Water at 100°*

1 g. of tetrameric cyanogen chloride is boiled for 24 hours in 100 g. of water. A solution is formed from which colourless crystals of cyanuric acid crystallise out upon cooling.

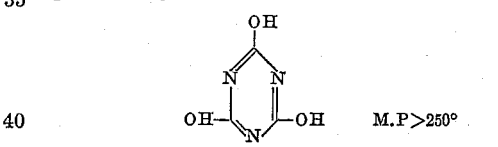

M.P>250°

|  | C, percent | H, percent | N, percent | O, percent |
|---|---|---|---|---|
| found | 27.84 | 2.39 | 32.48 | 37.35 |
| calculated | 27.91 | 2.34 | 32.56 | 37.19 |

Four equivalents of chlorine ions can be argentometrically determined in the acid aqueous filtrate and one equivalent of carbon dioxide can be washed out from the exhaust gas. In addition, the filtrate contains one equivalent of ammonia in the form of ammonium chloride.

EXAMPLE 2

The solution of 20 parts of diethylamine in 100 parts of benzene is added dropwise while stirring at 5° to a solution of 4.92 parts of tetrameric cyanogen chloride ($C_4N_4Cl_4$) in 100 parts of benzene. The mixture is stirred for 12 hours at 20° and then for 10 hours in an autoclave at 100°. The benzene solution is then shaken several times with cold water, separated, dried and the benzene is distilled off. The residue distills at 164–170° under 0.003 mm. Hg pressure as a colourless oil which does not solidify even on standing for a long time. The elementary analysis agrees with the formula $C_{20}H_{40}N_8$ (mol 392):

|  | C, percent | H, percent | N, percent |
|---|---|---|---|
| found | 61.00 | 10.28 | 28.23 |
| calculated | 61.18 | 10.27 | 28.55 |

In conformity with Formula II of the description and with the progress of the hydrolysis of tetrameric cyanogen chloride, the following formula is attributed to the new compound:

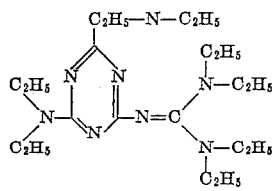

EXAMPLE 3

16.6 parts of well dried sodium salt of 4-chlorothiophenol are added gradually in portions while stirring at 5° to the solution of 4.92 parts of tetrameric cyanogen chloride in 200 parts of benzene. The suspension is stirred for 14 hours at 20° and then refluxed for 24 hours. After cooling, sodium chloride which precipitates in crystalline form is filtered off. The benzene is then distilled off and the colourless residue is recrystallised twice from isopropyl ether. Colourless crystals which melt at 152–156° are obtained. Elementary analysis agrees with the formula $C_{28}H_{16}N_4S_4Cl_4$ (mol 678):

|  | C, percent | H, percent | N, percent | S, percent | Cl, percent |
| --- | --- | --- | --- | --- | --- |
| found | 49.65 | 2.34 | 8.34 | 18.89 | 20.89 |
| calculated | 49.56 | 2.33 | 8.26 | 18.90 | 20.90 |

In conformity with Formula II of the description and with the progress of the hydrolysis of tetrameric cyanogen chloride, the formula

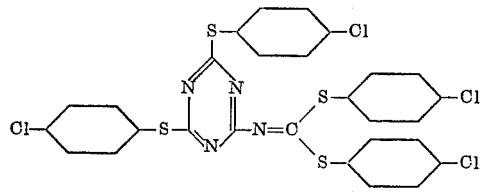

is attributed to the new compound.

EXAMPLE 4

25.5 parts of 1-amino-2-chlorobenzene are dissolved in 500 parts of acetone and 500 parts of water are added to the solution. 25.8 parts of tetrameric cyanogen chloride and 105 parts by volume of 2 N-caustic soda lye are added simultaneously at 0° while stirring in such a manner that the pH of the mixture is always between 5 and 6. The condensation product separates as a white solid body and is isolated by filtration.

The dried product, in the form of colourless, fine needles, is obtained in the pure state on recrystallising from benzene. On heating, this compound decomposes at temperatures of higher than about 170°. Elementary analysis agrees with the formula $C_{16}H_{10}N_6Cl_4$ (mol 428):

|  | C, percent | H, percent | N, percent | Cl, percent |
| --- | --- | --- | --- | --- |
| found | 45.04 | 2.31 | 19.60 | 32.97 |
| calculated | 44.90 | 2.35 | 19.64 | 33.12 |

In conformity with Formula II of the description and with the hydrolysis of tetrameric cyanogen chloride described in Example 3, the formula

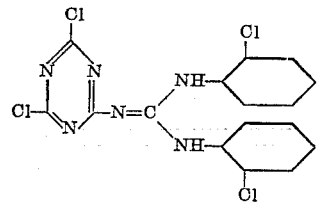

is attributed to the new compound.

EXAMPLE 5

3.6 parts of 2-(3'-amino-benzoylamino)-5-hydroxy-naphthalene-7-sulphonic acid are dissolved in 100 parts of water and 50 parts of acetone, the solution having a pH of 7-8. 4.1 parts of a condensation product of the formula

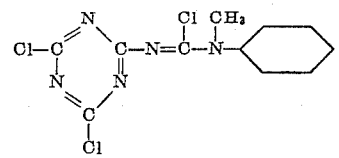

in 50 parts of acetone are then slowly added dropwise to this solution while stirring at 0°, N-caustic soda lye being simultaneously added so that the pH of the reaction solution is kept between 7 and 8. As soon as no more free amino groups are present, which is tested by diazotising and coupling, the reaction mixture is filtered. The acetone is removed from the filtrate in vacuo and then the condensation product is precipitated by the addition of 10 parts of sodium chloride. After washing with sodium chloride solution and drying in the desiccator, a colourless, water soluble condensation product is obtained. This product contains no more 2-(3'-amino-benzoylamino)-5-hydroxynaphthalene-7-sulphonic acid and it can be coupled with diazonium compounds easily.

In conformity with the general Formula II and the progress of the hydrolysis of tetrameric cyanogen chloride, the formula

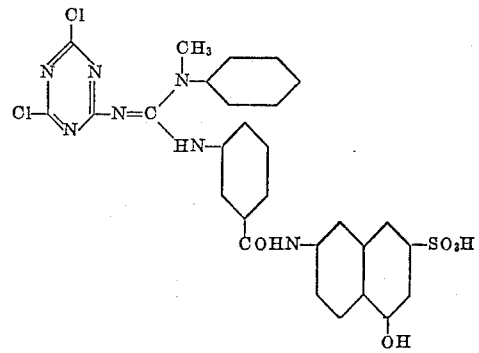

is attributed to the new compound.

To produce fast cellulose dyeings, cotton is impregnated with a 5% aqueous solution of the sodium salt of the above compound which solution also contains dissolved therein 5% of sodium bicarbonate and 10% of urea. The cotton is then squeezed out, dried at 50–80° and heated on the calender at 130–140° for about 3 minutes. The material is then rinsed, soaped, again rinsed and the still moist material is passed through an ice cold dilute solution of diazotised o-aminobenzene sulphonic acid. The cotton is squeezed out, passed through an ice cold 5% solution of sodium carbonate, rinsed, soaped and dried. A very wet fast orange dyeing is obtained.

EXAMPLE 6

5.14 parts of the condensation product produced from tetrameric cyanogen chloride and o-chloraniline according to Example 4 are dissolved in 100 parts of acetone and this solution is poured while stirring into a solution of 1.88 parts of 1,3-diaminobenzene-4-sulphonic acid in 50 parts of water and 0.4 part of sodium hydroxide. The suspension formed is heated to 50–55° and the pH is kept at 7–8 by the addition dropwise of an aqueous sodium carbonate solution. On completion of the condensation, it is diluted with 200 parts of water. The slight, insoluble precipitate is filtered off and the condensation product is precipitated from the filtrate by the addition of 10 parts of sodium chloride. The product so obtained of the formula

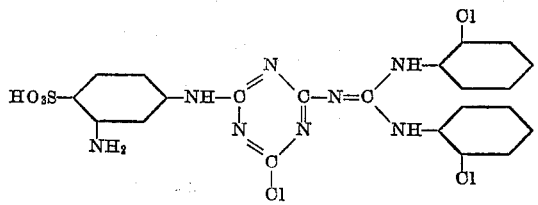

which no longer contains 1,3-diaminobenzene-4-sulphonic acid, dissolves easily in a mixture of water and alcohol but is fairly difficult to dissolve in water alone.

This compound is used to produce fast cellulose dyeings as follows:

Cotton is impregnated with a solution of 30 parts of the above compound in 1 litre of 50% aqueous ethanol which also contains 30 parts of sodium bicarbonate and 50 parts of urea dissolved therein, whereupon it is squeezed out and dried at 50–80°. The impregnated cotton is then heated on the calender for 3 minutes at 130–140°, rinsed in cold water, soaped hot with a 0.5% soap solution and finally rinsed. The moist material is then passed through a 5% aqueous solution of sodium nitrite, squeezed out and passed through first an ice cold 5% hydrochloric acid solution, then through cold water and finally through a 5% ice cold solution of 2-acetylamino-5-hydroxynaphthalene-7-sulphonic acid which latter also contains 5% sodium carbonate. An orange dyeing is obtained which, after rinsing, again soaping, rinsing and drying, has very good wet fastness properties.

EXAMPLE 7

5.6 parts of a condensation product obtained from o-phenylenediamine and tetrameric cyanogen chloride are pasted in 200 parts of water and 3.5 parts of diethylamine and then heated in an autoclave for 5 hours at 100–110°. After cooling, the reaction product is filtered off and recrystallised from dilute acetic acid. It then melts at 218°. The elementary analysis agrees with the formula $C_{18}H_{26}N_8$ (mol 354):

|  | C, percent | H, percent | N, percent |
|---|---|---|---|
| found | 60.77 | 7.60 | 31.72 |
| calculated | 61.01 | 7.40 | 31.63 |

The structural formula

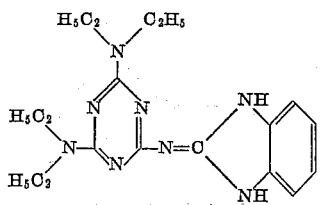

or the corresponding tautomeric form

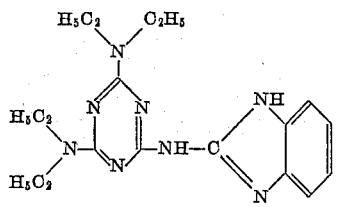

is attributed to the compound.

EXAMPLE 8

24.6 parts of tetrameric cyanogen chloride are dissolved in 300 parts of anhydrous ether and 20.2 parts of di-isopropylamine, dissolved in 100 parts of anhydrous ether, are added dropwise at a temperature of −15° over a period of 15 minutes. The reaction mixture is then stirred for 14 hours at 4° after which time it is neutral to litmus paper. The precipitated diisopropylamine hydrochloride is filtered off and the ether is evaporated. The residue is recrystallised from petroleum ether using some animal charcoal. The compound obtained has the formula $C_{10}H_{14}Cl_3N_5$ and melts at 94–98°.

Its structure is:

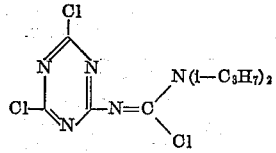

EXAMPLE 9

When effecting the reaction of Example 2 with 12.3 parts of dimethylamine instead of 20 parts of diethylamine, a condensation product corresponding to the empirical formula $C_{12}H_{24}N_8$ and having the structure

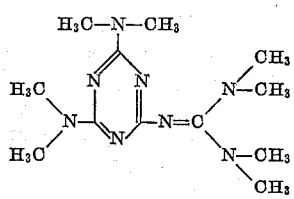

is obtained.

EXAMPLE 10

When effecting the reaction of Example 2 with 35.5 parts of di-n-butylamine instead of 20 parts of diethylamine, a condensation product corresponding to the empirical formula $C_{36}H_{72}N_8$ and having the structure

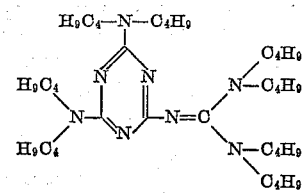

is obtained.

EXAMPLE 11

Three to four weeks old cotton plants are dusted with a pulverulent agent consisting of 10% active ingredient of the formula $C_8H_{10}Cl_3N_5$ obtained according to Example 1, and 90% of talcum. After three days the leaves are severely burnt.

EXAMPLE 12

6–10 cm. high mustard and oat plants are treated with a 0.5% aqueous emulsion of the compound $C_{20}H_{40}N_8$ obtained according to Example 2. After seven days the plants are completely killed.

EXAMPLE 13

A dust consisting of 10% of the compound of the formula $C_{20}H_{40}N_8$ obtained according to Example 2 and 90% of talcum as a carrier is applied to 3 to 4 weeks old cotton plants. The application causes severe leaf burns within 3 days.

EXAMPLE 14

A 1% solution in acetone of the compound of the formula $C_{20}H_{40}N_8$ obtained according to Example 2, completely kills the following fungi: *Alternaria tenuis, Bortrytis cin., Clasterosporium carp.* and *Coniothyrium d.*

EXAMPLE 15

A 1% solution in acetone of the compound of the formula $C_{28}H_{16}N_4S_4Cl_4$ obtained according to Example 3, radically kills the following fungi: *Clasterosporium carp., Coniothyrium d.*

EXAMPLE 16

A 1% solution in acetone of the compound of the formula $C_{16}H_{10}N_6Cl_4$ obtained according to Example 4, exhibits a repellant action against the ordinary house fly (*Musca domestica*).

EXAMPLE 17

A 0.1% solution in acetone of the compound of the formula $C_{18}H_{26}N_8$ obtained according to Example 7, gives an 87% kill of the fungus *Bortrytis cin.*

EXAMPLE 18

3–4 weeks old cotton plants are dusted with a pulverulent agent consisting of 10% active ingredient of the formula $C_{10}H_{14}Cl_3N_5$ obtained according to Example 8, and 90% of talcum. After 3 days the leaves are severely burnt.

If a 1% solution in acetone of this compound of Example 8 is used against fungi, an 80–95% kill of the following fungi is obtained: *Bortrytis cin.*, *Coniothyrium d.* and *Mucor sp.*

EXAMPLE 19

When performing the reaction of Example 2 with 12.3 parts of ethylamine instead of 20 parts of diethylamine, a condensation product corresponding to the empirical formula $C_{12}H_{24}N_8$ and having the structure

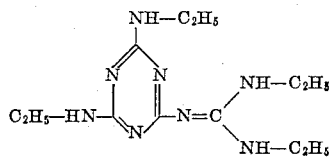

is obtained.

EXAMPLE 20

When effecting the reaction of Example 2 with 16.1 parts of isopropylamine instead of 20 parts of diethylamine, a condensation product corresponding to the empirical formula $C_{16}H_{32}N_8$ and having the structure

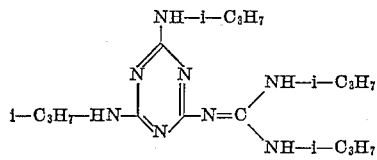

is obtained.

EXAMPLE 21

When reacting 4.92 parts of tetrameric cyanogen chloride with 7.1 parts of isopropylamine in a manner similar to that described in Example 2, a condensation product corresponding to the empirical formula $C_{13}H_{24}N_7Cl$, melting at 174–176° and having the following structure

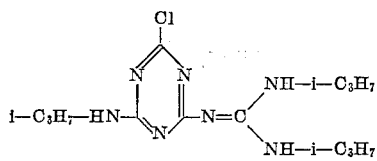

is obtained.

EXAMPLE 22

When reacting 4.92 parts of tetrameric cyanogen chloride with 3.6 parts of ethylamine in a manner similar to that described in Example 1, a condensation product corresponding to the empirical formula $C_8H_{12}N_6Cl_2$ and having the following structure

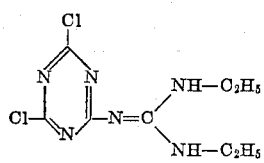

is obtained.

EXAMPLE 23

When reacting 4.92 parts of tetrameric cyanogen chloride with 4.72 parts of isopropylamine in a manner similar to that described in Example 1, a condensation product corresponding to the empirical formula $C_{10}H_{16}N_6Cl_2$ and having the structure

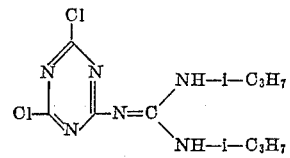

is obtained.

What we claim is:

1. New condensation products derived from tetrameric cyanogen chloride, of the formula

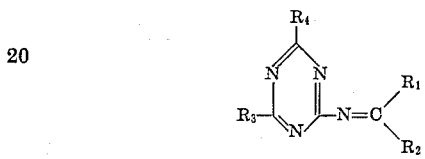

wherein $R_1$ represents a member selected from the group consisting of low molecular dialkylamino, low molecular monoalkylamino, anilino, N-(lower alkyl)-anilino and phenylmercapto, $R_2$, $R_3$ and $R_4$ independently of each other represent a member selected from the group consisting of chlorine atoms, low molecular dialkylamino, low molecular monoalkylamino, anilino, N-(lower alkyl)-anilino, anilino substituted in the nucleus by the 1-hydroxy - 3 -sulphonaphthaleneaminocarboxy - (6) group, anilino substituted in the nucleus by the amino group and phenylmercapto, and $R_1$ and $R_2$ together with the vicinal carbon atom also represent benzimidazolinyl.

2. The compound of the formula

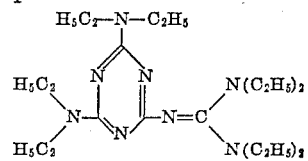

3. The compound of the formula

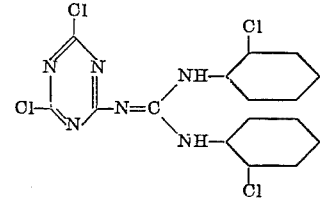

4. The compound of the formula

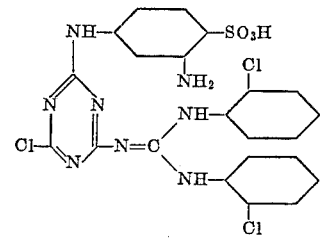

5. The compound of the formula

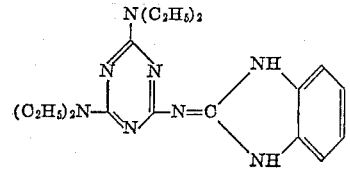

6. The compound of the formula
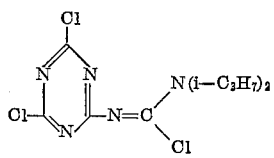
7. The compound of the formula
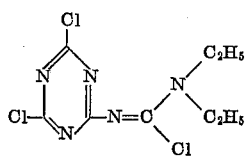
8. The compound of the formula
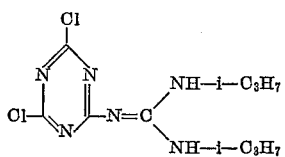
References Cited in the file of this patent
Schaefer et al.: J. of the Am. Chem. Soc., vol. 81, page 1471 (Mar. 29, 1959).